United States Patent
Brunsting

[11] Patent Number: 5,932,108
[45] Date of Patent: Aug. 3, 1999

[54] MAGNETIC FILTER ASSEMBLY

[76] Inventor: William J. Brunsting, 2171 Eagleton Lake, Lake Havasu City, Ariz. 86403

[21] Appl. No.: 08/476,726

[22] Filed: Jun. 7, 1995

Related U.S. Application Data

[63] Continuation-in-part of application No. 08/268,828, Jun. 30, 1994, abandoned, which is a continuation-in-part of application No. 08/118,391, Sep. 7, 1993, abandoned.

[51] Int. Cl.$^6$ ..................................................... B01D 35/06
[52] U.S. Cl. .......................... 210/695; 210/223; 184/6.25
[58] Field of Search ..................................... 210/222, 223, 210/695; 209/224; 335/302, 304, 306; 184/6.25; 95/28; 96/1

[56] References Cited

U.S. PATENT DOCUMENTS 2,678,729   5/1954   Spodig ..................................... 210/222

FOREIGN PATENT DOCUMENTS

WO 90/10598   9/1990   WIPO ..................................... 210/222

*Primary Examiner*—Matthew O. Savage
*Attorney, Agent, or Firm*—Jack C. Munro

[57] ABSTRACT

An apparatus for removing metallic particles from lubricating oil used in engines, comprised of a magnetic member having a number of magnets positioned around a typical engine oil filter and an optional mechanism for adjustably securing the magnetic member to the oil filter. The magnetic member is arcuate and multiple members can be used to extend over substantially the entire circumference of the oil filter. The magnets in magnetic member are spaced one from another with the adjacent sides of adjacent magnets being of like polarity to intensify and direct the magnetic field into the filter.

8 Claims, 1 Drawing Sheet

MAGNETIC FILTER ASSEMBLY

This is a continuation-in-part of U.S. patent application Ser. No. 08/268,828, filed Jun. 30, 1994, now abandoned, which was a continuation-in-part of U.S. patent application Ser. No. 08/118,391, filed Sep. 7, 1993 and now abandoned.

BACKGROUND OF THE INVENTION

The present invention generally relates to an apparatus for removing sub-micron to micron-sized metallic particles from circulating fluids and, in particular, is concerned with a magnetic assembly for use on a disposable canister-type filter that attracts and holds ferro-metallic particles and prevents circulation of these particles in an engine or other mechanical device which circulates fluids for lubrication, cooling, etc.

Most engines used in automobiles, trucks, and boats include canister-type oil filters that filter the engine's lubricating oil, removing foreign matter therefrom. To eliminate the larger particles of foreign matter, the engine oil is typically forced through a porous material in the oil filter that allows the liquid oil to pass through, but does not allow the passage of the larger particles. In this manner, the larger particles of foreign matter can be removed from the engine's lubricating oil. However, because this separation technique relies upon filtration through a porous material, particles that are smaller than the openings in the porous material are normally not removed by the filter medium. One particularly harmful type of foreign matter which accumulates in lubricating oil is the small metallic particles which can be created by frictional contact between the moving metal parts of the engine. These metallic contaminants are known to damage important engine components as they circulate through the engine.

Small metallic particles often have a cross-sectional dimension smaller than the openings in the porous filter material. When not removed by the oil filter, these small metallic particles will freely circulate through the engine until they are finally removed when the oil is changed. Typically, the porous material used in oil filters consists of a fibrous material that has openings as small as an average of 20 microns in diameter. Hence, metallic particles with a cross-sectional dimension of 20 microns or smaller are often not trapped by the filter.

These micron and sub-micron-sized metallic particles are a major cause of wear for the moving components of the engine. Specifically, as the oil is circulated throughout the engine to lubricate the various moving components, the metallic particles entrained in the oil are carried to the interface between the moving components. At these locations, metal bears against metal, and reliance is placed solely upon the oil to maintain a lubricating film. Damage to the adjoining surfaces is likely when the metal particle contaminants are introduced to such critical interfaces. This damage eventually results in a degradation of the close tolerances between the moving parts, causing the performance of the engine to decrease accordingly. By some estimates, these metallic particles are the cause of more than one-half of the wear on the engine.

One approach taken by the prior art to eliminate these particles has been to install a magnetized drain plug in the crankcase of the engine. The magnetized drain plug generates a magnetic field around the magnet within the crankcase, which in turn attracts and removes some of the metallic particles from the lubricating oil as it flows through the crankcase. However, when the engine is running, the flow of oil through the crankcase can be at such a high flowrate so as to carry the metallic particles entirely through the magnetic field produced by the magnetized drain plug. In other cases, the magnetic field itself is insufficiently strong or extensive to attract and remove a meaningful number of particles from the lubricating oil.

Another prior approach to solve this problem has been to attach a magnet to the oil filter to create a magnetic field within the filter that attracts and holds the metallic particles against the walls of the filter, thereby preventing circulation of the metallic particles in the engine. An example of this approach is shown in U.S. Pat. No. 5,078,871 issued Jan. 7, 1992, to McCready. It is intended that these magnets create a magnetic field within the oil filter attracting the particles to the inner surface of the outer oil filter wall where the magnet assembly is attached.

Unfortunately, the device disclosed in U.S. Pat. No. 5,078,871 and other such known devices attached to the filter are unlikely to generate a sufficiently strong magnetic field to attract most it not all of the metallic particles in the oil. Metallic particles contained in the oil even if they pass through the weak magnetic field are not likely to be attracted and thus they continue to circulate through the engine. Furthermore, the filter strip disclosed by U.S. Pat. No. 5,078,871 is permanently affixed to the outside of the oil filter. Hence, the effective life of the device is only as long as the effective life of the filter, and once the oil filter is disposed of, the permanently affixed magnetized strip is also thrown away.

Prior solutions to the problem of micron and sub-micron sized metallic particles in a circulating fluid are disclosed in co-pending patent application Ser. No. 08/268,828, filed Jun. 30, 1994, and hereby incorporated by reference. The invention of that application comprises a magnetic member having a plurality of alternating regions of polarity affixed to the interior or exterior of the metal canister of the oil filter. A steel flux amplifier band covers the outer surface of the magnetic member to amplify and direct the magnetic field within the oil filter. As the oil passes through the filter, the magnetic field generated by the magnet on the canister is sufficiently strong to attract and retain the metallic particles as a result of the flux amplifier band.

However, other configurations for a magnetic member could advantageously provide a sufficiently strong magnetic field to attract and retain the metallic particles.

Consequently, a need still exists for an improved device for removing micron and sub-micron-sized metallic particles from the lubricating oil flowing through an engine. To this end, there is a need for a device that can generate a stronger magnetic field, and with a greater depth of field, than any of the devices previously known heretofore in the art. This device should be mountable on the oil filter and adaptable for use on different sizes of oil filters. This device should also be readily removable and reusable on different oil filters.

SUMMARY OF THE INVENTION

The aforementioned needs are addressed by the present invention, comprised of an apparatus for generating a strong magnetic field with a depth of field characteristic that allows the magnetic field to penetrate radially inward into an oil filter with a sufficient field strength to attract and retain micron and sub-micron-sized metallic particles. This apparatus includes a magnetic member positioned around the outside of an oil filter canister. The magnetic member includes a plurality of individual magnets each of which has an inner face directed toward the canister of the oil filter. Each magnet has a pair of spaced sides which have opposite polarities. Further, each magnet is spaced from an adjacent magnet and oriented so that the adjacent sides on the adjacent magnets have a like polarity.

The inner surface of each magnet is spaced from the canister wall and preferably the device according to this invention includes a non-magnetic spacer such as aluminum positioned between the canister wall and the inner surface of each magnet. A pole insert, having a high magnetic permeability, is positioned between the adjacent magnets. Additionally, a non-magnetic outer band covers an outer surface of each magnet. A high permeability flux enclosure preferably surrounds the band to contain the magnetic field generated by the device and to inhibit foreign particles within the engine compartment from being attracted to the magnetic member. Preferably screws are inserted into the pole pieces between each magnet to secure the respective members of the device together and an adjustable securing band or strap can optionally be used to removably secure the magnetic member to the external surface of the oil filter canister. Preferably, each device having multiple magnets may be fabricated in a shell so that a number of them can be secured around the circumference of the filter canister.

The like poles of the adjacent magnets of a presently preferred embodiment of this invention produce magnetic flux lines which will not cross one another due to the fact that they are of like polarity. The interacting energy fields produced by the magnets thus positioned cause a repulsion of the magnets one from another which, when the magnets are held in place, force the competing lines of flux to move at right angles to the sides or poles of the magnets to complete the magnetic circuits. As a result, the magnetic circuit for each magnet is self-contained. In other words, the magnetic circuit for a specific magnet begins and originates on the opposing poles or sides of that magnet and does not cross the flux lines of the adjacent magnet.

The magnets are located close to one another according to this invention and their like or repelling fields combine within a confined space to intensify the field directed at right angles to the magnet poles. In this way, a magnetic field of higher intensity is created according to this invention and is sufficiently strong to attract and retain the metallic particles circulating in the fluid within the canister.

It is important to confine and direct the available magnetic flux without short-circuiting the magnetic flux path. Therefore, according to this invention a path of least reluctance is designed into the circuit to combine and direct the magnetic energy and yield a high efficiency magnetic member. As a result, the magnets according to this invention are held slightly away from a filter canister in order to direct the majority of the flux toward the facing poles of the adjacent magnets and not directly into the filter canister or through the inner surface of the magnets. Thus, much of the magnetic energy is forced at right angles to the sides of the magnets and then into the canister wall between the adjacent magnets and from that point, is required to reach to the region inside the filter in which the fluid circulates before turning back to the opposite magnetic pole of the magnet from which it originated to complete the magnetic circuit. The spacing between the adjacent magnets and the surrounding non-magnetic outer band prevents the field from short-circuiting and thereby robbing the space between the adjacent magnets of available energy.

During engine operation, lubricating oil is circulated through the oil filter and then throughout the engine. As the oil passes through the filter, the magnetic field generated by the magnetic member attracts the sub-micron and micron-sized ferro-metallic particles from the oil and holds them against the interior surface of the outer canister of the oil filter, thereby preventing these particles from re-circulating through the engine.

The intensity of the field generated in the oil filter canister and the depth of the field, i.e., the distance the field extends outward from the magnetic member with sufficient intensity to attract the particles from the lubricating oil, is dependent largely in part upon the configuration of the magnet poles and their position relative to the canister. The device of this invention is capable of attracting the sub-micron and micron-sized metallic particles radially outward toward the interior surface of the canister through substantially all of the region between the filter element and the canister wall through which the oil flows.

Another aspect of the present invention is that the magnetic member is designed for use as a single assembly unit on a variety of different sizes of oil filters or as part of a series of units sized and numbered according to this invention for use on a wider variety of filters.

A further aspect of the present invention is that the flux enclosure also serves to protect the magnetic member from damage caused by an external source, e.g., flying debris, etc., as well as to prevent breakage of the unit. Further, the flux enclosure contains the magnetic field to inhibit the attraction of metallic particles external to the filter in the engine compartment toward the device.

BRIEF DESCRIPTION OF THE DRAWINGS

These and other objectives and aspects of the present invention will become more fully apparent from the following detailed description and appended claims taken in conjunction with the accompanying drawings in which:

DETAILED DESCRIPTION OF THE PREFERRED EMBODIMENTS

Figure 1:
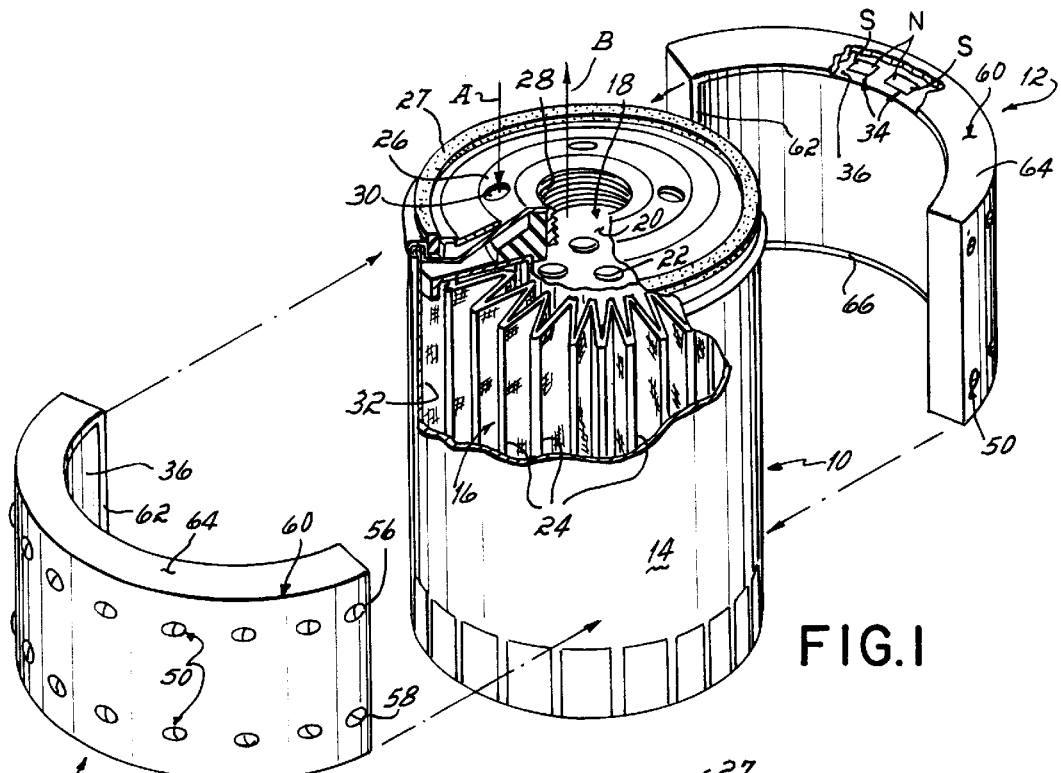
FIG. 1 is an exploded perspective view of a pair of magnetic members according to a presently preferred embodiment of this invention for use on a typical oil filter cartridge shown partially sectioned.

Reference is now made to the drawings wherein like numerals refer to like parts throughout. Referring to FIG. 1, the components of a typical oil filter 10 such as a Type PF35 Duraguard Oil Filter manufactured by AC-Delco, General Motors Corporation, used on automotive engines, and the components of a preferred embodiment of a magnetic filter member or assembly 12 of the present invention are shown. Although the invention is shown and described with reference to a cylindrical oil filter, it is readily applicable for removing ferrous metallic particles from circulating fluids in general through modification by one of ordinary skill in the art.

The oil filter 10 includes a cylindrical, closed-ended canister 14 that is preferably made of a ferrous material such as steel. The canister wall thickness is typically 0.014 to 0.018 inches thick for thin wall canisters and 0.028 to 0.032 inches thick for thicker wall canisters having higher gallons per minute flow rate therein. A filter element 16 is contained within the canister 14 and is generally cylindrical in shape and includes a hollow center core 18 with a center shaft liner 20 having a plurality of circular holes 22 formed therein. A plurality of filter vanes 24 are positioned entirely around, and radially outward an equal distance from, the center core 18. Typically, the filter vanes 24 are made of a porous, fibrous material that allows the oil to pass through but traps larger foreign particles.

A circular plate 26, generally made of steel, is flushly mounted to a top end of the cylindrical canister 14. The circular plate 26 includes a rubber seal 27 and a circular threaded opening 28 positioned in the center of the plate 26. The threaded opening 28 provides access to the hollow center core 18 of the filter element 16. The circular plate 26 also includes a number of circular openings 30 positioned radially outward from the threaded opening 28, and circumferentially spaced an equal distance from one-another.

The oil filter 10 is generally threaded onto a suitable filter mount (not shown) located on the engine (not shown) in conventional fashion so that the engine's lubricating oil enters the filter 10 through the openings 30 as shown by arrow A in FIG. 1 to fill a region or volume 32 between the interior wall of the canister 14 and the vanes 24 of the filter element 16. The porous nature of the material forming the vanes 24 permits the oil to seep through to the center core 18, while preventing the larger particles of foreign matter entrained in the oil from entering the center core 18. The oil entering the center core 18 is then re-circulated back into the engine as indicated by arrow B through the threaded opening 28 to provide lubrication to the engine. Thus, the structure and the operation of the oil filter 10 is typical of most disposable canister type oil filters used in conjunction with automobile, truck, boat and large generator engines.

The magnetic filter assembly 12 includes a plurality of magnets 34, each of which may be constructed of any magnetic material possessing sufficient magnetic strength, resistance to the longer-term effects of heat and oil/fluid and sufficient physical strength. Preferably, the magnets 34 used in the magnetic filter assembly 12 according to this invention should have a strong resistance to demagnetization (i.e., a high coercivity) so that the strength of the magnetic fields generated by the magnets 34 are not substantially reduced or knocked down within the magnets 34 or the space surrounding them.

In a presently preferred embodiment, the magnets 34 are made out of a fully dense magnetic material, such as ceramic barium or strontium ferrite, metallic neodymium iron boron or samarium cobalt, according to the present state of the art in magnetic materials. In the embodiment shown in FIGS. 1–3, the magnets 34 are comprised of fully dense, sintered neodymium iron boron. Each magnet 34 preferably produces a magnetic field having an energy product on the order of 30–45 MG·Oe. Each magnet 34 would preferably be a fully dense metallic alloy. The magnetic material is preferably fully dense, sintered neodymium iron boron in one presently preferred embodiment. Preferably, each magnet 34 has a radial thickness of about 0.25 inches, a circumferential width of about 0.125 inches and an axial length of about 2.0 inches.

Figure 3:
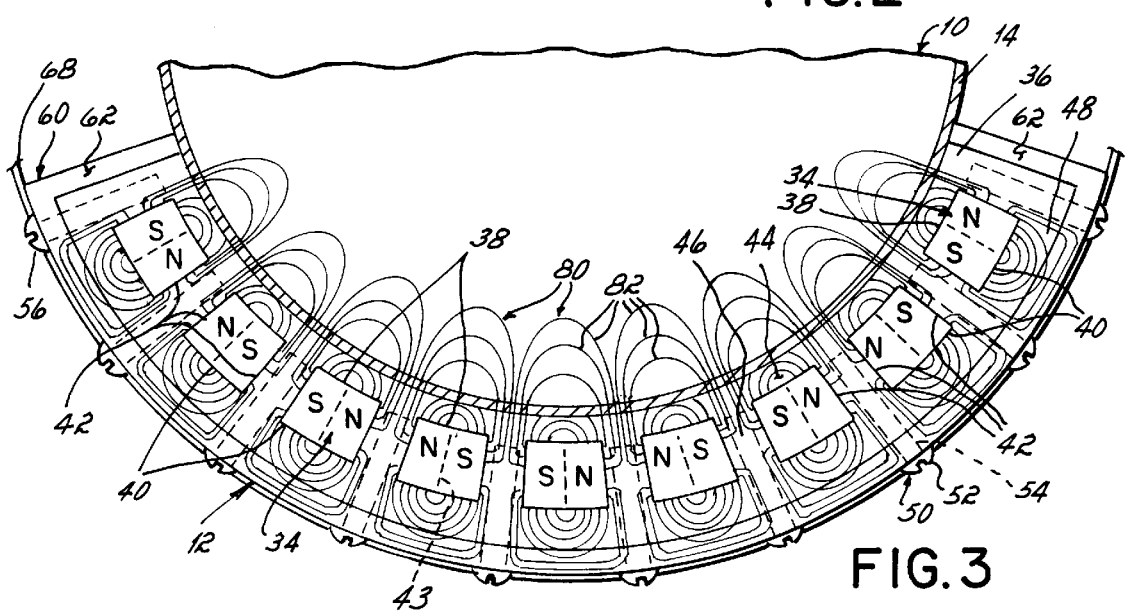
FIG. 3 is an enlarged cross-sectional view of the magnetic member on a filter canister diagrammatically showing the flux lines in the filter generated by the magnets.

As shown particularly in FIGS. 1 and 3, each magnet 34 is contained within a casing 36 and includes an inner surface 38 directed toward or facing the oil filter canister 14, an outer surface 40 directed outwardly from the canister 14 and a pair of opposed sides 42 extending between the inner and outer surfaces 38, 40. Each side 42 of each magnet 34 has a polarity opposite from the polarity on the other side 42 of that magnet 34. Further, the adjacent sides 42 of adjacent magnets 34 of the assembly 12 have a like polarity as indicated in FIGS. 1 and 3. It will be appreciated that the north and south poles, indicated by N and S respectively in FIGS. 1 and 3, on each magnet can be reversed provided that each side 42 of each magnet 34 has a polarity opposite from the opposing side 42 of that magnet 34 and similar to the polarity of the adjacent side of the adjacent magnet 34. The transition from a first polar region to the opposite polar region within each magnet 34 is indicated by a dashed line 43 in FIG. 3.

The sides 42 of adjacent magnets 34 are preferably oriented substantially parallel with respect to each other and project generally perpendicular to the canister 14 wall. Due to the arcuate configuration of the assembly 12, it may prove preferable to taper each magnet 34 so that it is contained within the casing 36 and the outer surface 40 of each magnet 34 has a larger circumferential dimension than the inner surface 38 thereof. Further, each magnet may include an impermeable coating such as an epoxy, nickel, phenolic or the like for protection of the magnet 34.

The casing 36 includes a spacer 44 positioned between the inner surface 38 of each magnet 34 and the outer surface of the canister 14. As a result, each magnet 34 is spaced from the filter canister 14 as shown particularly in FIG. 3. A pole insert 46 is provided between the adjacent magnets 34 and an outer band 48 surrounds the outer surface 40 of each magnet 34 to complete the casing 36. Each pole insert 46 preferable contacts the canister 14 to provide a continuous path for the flux emanating from the magnets 34 into the region 32. The outer band 48, pole inserts 46, and spacers 44 can be formed as a single member with the magnets 34 encased therein or the band 48, pole inserts 46 and spacers 44 can be manufactured as individual units and secured together such as by epoxy, adhesive or a fastener such as a plurality of screws 50 each having a head 52 retained on the exterior surface of the assembly 12 and a shaft 54 which projects through the band 48 and into the insert 46 and spacer 44. According to the presently preferred embodiment of the invention, an upper and a lower row 56, 58, respectively, of screws 50 are provided on the assembly 12.

The outer band 48 and spacers 44 are preferably fabricated from a non-magnet material such as aluminum or the like which will have little or no effect upon the magnetic field and flux lines generated by the magnets 34. In other words, the band 48 and spacers 44 effectively provide an air gap to the magnetic field generated by the magnets 34 so the magnetic flux passes out of the magnets 34 and into the pole inserts 46 which provide a high permeability path. Alternative materials for the band 48 and spacers 44 include various polymers or plastics which being non-magnetic likewise would not effect the magnetic flux lines but can be easily manufactured and shaped into the appropriate configurations and will provide a durable and long lasting magnetic filter assembly 12 according to this invention.

A flux enclosure 60, preferably a high permeability material such as low carbon or mild steel or the like, surrounds the exterior of the assembly 12. The flux enclosure 60 includes a sidewall 62 on the lateral side edges of each assembly 12 and an upper cap 64 and a lower cap 66 to enclose the upper and lower edges, respectively, of the assembly 12 as shown particularly in FIG. 1. The flux enclosure 60, including the sidewalls 62 and caps 64, 66, encloses the magnetic field generated by the magnets 34 and thereby inhibits metallic materials or particles external from the filter 10 in the engine compartment from being attracted toward the assembly 12.

In one presently preferred embodiment of the invention, the radial width of the flux enclosure 60 may be approximately 0.080 inches and the radial width of the outer band 48 about 0.06 inches. Likewise, the radial width of each spacer 44 may be approximately 0.06 inches and the circumferential length of each pole insert 46 is approximately equal to the width of each magnet 34 or about 0.125 inches.

Additionally, the flux enclosure 60 is preferably dimensioned so that it covers substantially all of the outer surface of the band 48 to provide an effective, high permeability path for proper retention and re-direction of the flux emanating from the outer surface 40 of the magnets 34. Further, the flux enclosure 60 should be thick enough, and thereby have sufficient mass and permeability to substantially carry the magnetic flux generated by the magnets 34, yet should also be sufficiently thin to avoid adding unnecessary weight and diameter to the assembly 12.

The assembly 12 is preferably positioned about ½ inch from the plate 26. In the presently preferred embodiment shown in FIGS. 1–3, the flux enclosure 60 may have a radial thickness of about 0.080 inches. Preferably, the outer surface and all other exposed surfaces of the flux enclosure 60 and other components of the assembly 12 are powder coated or otherwise coated with a suitable rust and corrosion inhibiting coating.

The magnetic assembly 12 is positioned around the outer surface of the canister 14 of the oil filter 10 and may be secured in this position by a tensioning strap 68, which is preferably made out of stainless steel. The tensioning strap 68 is generally circular in configuration and positioned around the outer radial surface of the assembly 12 preferably between the upper and lower rows 56, 58, respectively, of screws 50 as shown in FIG. 2.

The tensioning strap 68 is optional and of a conventional design, including a clamp or screw 70 extending through a flange 72 which maintains the threads of the screw 70 in engagement with slots 74 on the strap 68. Tightening the screw 70 reduces the circumference of the tensioning strap 68. Conversely, loosening the screw 70 increases the circumference of the tensioning strap 68. In this fashion, the tensioning strap 68 can be adjusted to secure the magnetic filter assembly 12 to the filter 10 so that the inner surface of the spacer 44 is in intimate contact with the outer surface of the oil filter canister 14. As can be appreciated by one of ordinary skill, the tensioning strap 68 can be replaced by an equivalent structure.

Figure 2:
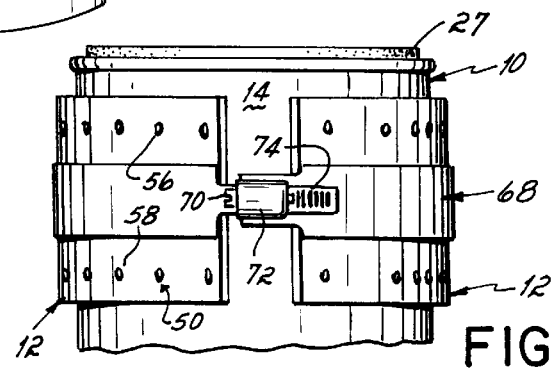
FIG. 2 is a partial side elevational view of the magnetic members secured to the oil filter with an adjustable clamp.

As shown in FIGS. 1–3, multiple magnetic filter assemblies 12 are preferably used on a single oil filter 10 to provide coverage around substantially the entire circumference of the canister 14. The magnetic assemblies 12 are preferably positioned proximate the top end and plate 26 of the oil filter canister 14 so that the magnetic field generated attracts the ferrous-metallic particles (not shown) as they enter the canister 14 through the holes 30 in the steel plate 26. Preferably, the magnetic assemblies 12 are spaced approximately one-half inch from the top edge of the canister 14 as shown in FIG. 2 so that the generated magnetic field is not detrimentally influenced by turbulence as the oil enters the filter body through the holes in the steel plate 26.

Furthermore, the axial length of the magnetic filter assemblies 12 should preferably cover approximately one-third of the axial length of the filter canister 14. Therefore, the magnetic filter assemblies 12 in this preferred embodiment having an axial length of about 2 inches are appropriately sized for an oil filter canister of approximately 6 inches in height. Multiple assemblies 12 can be positioned both axially and circumferentially on the canister 14 to provide the preferred coverage for larger sized filters. The coverage of the assemblies 12 on the canister 14 is a function of the flow rate of the oil through the filter 10 and the wall thickness of the canister 14.

Once both the assemblies 12 are installed around the canister 14 of an oil filter 10, the screw 70 of the tensioning strap 68 is tightened to ensure that the magnetic filter assemblies 12 are securely retained on the oil filter 10. Preferably, the tensioning strap 68 is sufficiently tightened to ensure that there is intimate contact both between the inner surface of the assembly 12 and the outer surface of the oil filter canister 14 over substantially all of their shared interface. In some applications, the optional tensioning strap 68 may be omitted in that the magnetic attraction between the assembly 12 and the canister 14 is sufficient to retain the assembly 12 in place and maintain intimate contact with the canister 14. However, if the canister 14 is fabricated from a non-ferrous material such as aluminum, plastic or the like then the tensioning strap 68 or equivalent device will be required to secure the assembly 12 to the canister 14.

The above-described apparatus for securely mounting the assembly 12 in intimate contact with an oil filter 10 permits the magnetic filter assembly 12 to be reused when the filter 10 is replaced, and it also permits the assembly 12 to be used on oil filters 10 having moderately different dimensions. In addition, the tensioning strap 68 used in conjunction with the assembly 12 results in compressive forces, directed radially inward, being applied to the assembly 12.

As a further modification to the invention, additional or secondary permanent magnets (not shown) with like poles, could be positioned proximate the top of the magnets 34 so as to further focus or direct and intensify the available flux from the magnets 34 in the desired direction toward the canister 14. The repelling poles of the secondary magnets proximate the top of the magnets 34 force the available flux at the top of the magnets 34 to find an easier circuit path, which is between the magnets 34 and into the canister 14 as previously described. As the "bucking" field of the secondary magnets directs the flux from the magnets 34 in the desired direction, the magnetic field generated thereby is further intensified.

FIG. 3 illustrates a typical cross-section of the assembly 12 as shown in the preferred embodiment shown in FIGS. 1–2. A magnetic circuit or field 80 is generated by each magnet 34 in the presently preferred embodiment of the invention. Flux lines 82 of the field 80 produced from each pole of each magnet 34 emanate from the side 42 of the magnet 34 outwardly as shown in FIG. 3. However, because the adjacent side 42 of the adjacent magnet 34 is of like polarity, the flux lines 82 generated by the adjacent magnet 34 have the same polarity. The interacting flux lines 82 produced by the adjacent magnets 34 will not cross one another. As a result, the flux lines 82 emanating from each side 42 of each magnet 34 will move at right angles to the sides 42 so that the magnetic circuits 80 can be completed as will be described.

The flux lines 82 to avoid crossing the like polarized flux lines 82 from the adjacent magnet 34 will be directed at right angles to the side 42 of each magnet 34 and will travel inwardly toward the spacer 44 and canister 14 or outwardly toward the band 48 and flux enclosure 60 as shown in FIG. 3. Those flux lines directed inwardly pass through the spacer 44. The magnets 34 are held slightly away from the canister 14 by the spacer 44 in order to direct the majority of the flux toward the adjacent like polarity pole and thereby force it at a right angle from the side 42 of the magnet 34. Thus, much of the magnetic energy is forced at right angles through the canister 14 between the adjacent magnets 34. When the flux lines 82 penetrate into the canister 14 they create the magnetic field 80 within a region 32 of the filter 10 that the oil circulates and thereby attract and retain the metallic particles therein. These particles are retained against the inner surface of the filter canister 14 by the magnetic field 80. Once the flux lines 82 penetrate into the filter and the region 32 of circulating oil, they turn toward the opposite polarity on the opposing side 42 of the same magnet 34 to thereby complete the magnetic circuit 80 for that magnet 34. Because the adjacent sides 42 of the adjacent magnets 34 are of like polarity, each magnet 34 generates an individual magnetic circuit 80 which does not overlap or interfere with the magnetic circuit 80 for the adjacent magnet 34.

The high permeability pole inserts 46 between the adjacent magnets 34 collect and direct the magnetic flux 82 directly to the canister 14 and into the region 32 of circulating fluid. The pole pieces 46 should preferably be of a permeability and size that permit them to carry all of the available flux 82 for the most efficient design of the device according to this invention. The pole inserts 46 should not exceed magnetic saturation to avoid flooding the circuit and thereby distorting the flux path as described according to this invention.

The flux lines 82 which emanate from the sides 42 of the magnets 34 and are directed at right angles outwardly from the canister 14 some of which penetrate into the high permeability flux enclosure 60. The flux lines 82 then proceed through the flux enclosure 60 and return to the opposite pole of that magnet 34 to complete the circuit 80. The flux which penetrates through the band 48 and into the flux enclosure 60 is retained in the flux enclosure 60 and directed around to the opposite pole as shown in FIG. 3. The spacers 44 and outer band 48 as previously described are non-magnetic and have a high permeability so that they will not detrimentally effect or impact the flux lines and magnetic field generated by the magnets.

Therefore, the design of the magnetic filter assembly 12 according to this invention significantly improves the magnetic field 80 generated by the individual magnets 34 to provide a sufficiently strong field 80 in the region 32 within the filter 10 to attract essentially all ferro-metallic particles within the region 32 and hold them against the interior surface of the canister 14. The like poles on the adjacent magnets 34 are sometimes referred to as "bucking poles" and the flux lines 82 generated by the bucking poles will not cross and are thereby directed at right angles from the poles inwardly toward the canister 14 and the region 32 of circulating fluid. The bucking pole configuration of the magnets 34 according to this invention produce the increased magnetic field strength to thereby attract and retain the circulating metallic particles.

Further, secondary magnets (not shown) can be positioned in the upper cap 64 of the assembly 12 according to this invention to further direct the flux lines 82 emanating from the magnets 34 proximate the upper end thereof according to this invention. Further, it is within the scope of this invention to position the magnetic assembly 12 on the interior of the filter canister 14 within the region 32 and thereby attract and retain the ferro-metallic particles circulated in the filter 10. Although, with the assembly 12 positioned on the interior of the canister 14, the assembly 12 will likely not be reusable and an additional layer of high permeability material may need to be added to the canister 14 proximate the assembly 12.

The device described herein generates a magnetic field in the oil filter with a greater depth and strength than known devices to extend the field radially inward into the canister a greater distance, and to allow substantially all of the micron and sub-micron sized metallic particles in the filter to be attracted and held against the interior wall of the canister.

Although the preferred embodiments of this invention have been shown and described with specific dimensions, configurations, and applications, it will be understood by one of ordinary skill in the art that various omissions, substitutions, and changes in these embodiments are possible without deviating from the scope of this invention.

Specifically, the foregoing description of the preferred embodiment of the present invention has been limited to a description of using the magnetic filter assembly in conjunction with a type of oil filter that is primarily used in automotive and high performance engines. As a person skilled in the art can readily appreciate, the present invention can be modified to be used with other types of filters and applications to remove entrained ferrous metallic particles from a circulating fluid in general. Consequently, the scope of the invention should not be limited to the foregoing description, but is to be defined by the appended claims and equivalents thereof.

I claim:

1. A method for removing ferrous metallic particles from a circulating fluid comprising:

providing a magnetic member having a plurality of magnets, each said magnet having an inner surface and first and second spaced sides, said first side of each said magnet having a polarity opposite from said second side, each said magnet being spaced from an adjacent said magnet, each said side of said magnet having a like polarity with respect to an adjacent side of said adjacent magnet;

a canister, said canister having an external surface; and attaching said inner surface of said magnetic member to said external surface of said canister proximate a region within said canister in which the fluid circulates so that said inner surface on each magnet faces said region and a magnetic field generated by said magnetic member attracts the ferrous metallic particles.

2. The method of claim 1 further comprising:

releasably retaining said magnetic member to said canister with an adjustable retention band.

3. The method of claim 1 further comprising:

spacing said inner surface of each said magnet from said canister.

4. The method of claim 1 further comprising:

positioning a non-magnetic spacer between said inner surface of each said magnet and said canister.

5. The method of claim 1 further comprising:

positioning a pole insert of high magnetic permeability between said magnet and each said adjacent magnet.

6. The method of claim 1 further comprising:

covering an outer surface of each said magnet with a non-magnetic band.

7. The method of claim 1 further comprising:

containing magnetic flux generated by said magnetic member which is directed outwardly from said canister.

8. A system for removing entrained ferrous metallic particles from circulating engine lubricating oil, the system comprising:

an oil filter receiving the circulating oil therein, said filter having an external canister and a filter medium therein, a region in which the fluid circulates being internal to said filter generally between said filter medium and said canister;

a magnetic member adapted to be mounted to an external surface of the canister to attract the ferrous metallic particles toward said magnetic member and inhibit them from exiting the canister;

a plurality of magnets within said magnetic member, each said magnet having an inner surface facing said canister and spaced first and second sides, said first side of each said magnet having a polarity opposite from said second side, each said magnet being spaced from an adjacent said magnet, each said side of said magnet having a like polarity with respect to an adjacent side of said adjacent magnet to direct a magnetic field generated by said magnet toward the region and attract the ferrous metallic particles.

* * * * *